(12) United States Patent
Odaka et al.

(10) Patent No.: US 6,695,984 B1
(45) Date of Patent: *Feb. 24, 2004

(54) SILICON CARBIDE SINTER AND PROCESS FOR PRODUCING THE SAME

(75) Inventors: Fumio Odaka, Niiza (JP); Yoshitomo Takahashi, Fujisawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/744,918

(22) PCT Filed: Aug. 6, 1999

(86) PCT No.: PCT/JP99/04274

§ 371 (c)(1),
(2), (4) Date: Jan. 31, 2001

(87) PCT Pub. No.: WO00/07959

PCT Pub. Date: Feb. 17, 2000

(30) Foreign Application Priority Data

Aug. 7, 1998 (JP) .......................... 10-224416
Aug. 7, 1998 (JP) .......................... 10-224451
Oct. 16, 1998 (JP) .......................... 10-295814

(51) Int. Cl.$^7$ .................. C01B 31/36; C04B 35/565; H01L 21/02; H01L 21/22; H01B 1/00
(52) U.S. Cl. .................. 252/504; 252/500; 252/504; 252/516; 252/521.3; 423/345; 423/439; 501/88; 501/92; 264/625
(58) Field of Search .................. 252/500, 504, 252/516; 423/345, 439; 501/88, 92; 264/612, 614, 625, 647

(56) References Cited

U.S. PATENT DOCUMENTS

| | | | | |
|---|---|---|---|---|
| 4,561,891 A | | 12/1985 | Maeda et al. ............ 75/238 |
| 5,322,824 A | | 6/1994 | Chia ........................ 501/89 |
| 5,589,116 A | * | 12/1996 | Kojima et al. ............ 264/628 |
| 5,801,073 A | * | 9/1998 | Robbins et al. ............ 438/125 |
| 5,955,391 A | * | 9/1999 | Kameda et al. ............ 204/192.28 |
| 2002/0070485 A1 | * | 6/2002 | Odaka et al. ............ 264/682 |

FOREIGN PATENT DOCUMENTS

| | | | | |
|---|---|---|---|---|
| JP | 05-315056 | * | 11/1993 | |
| JP | 5-315056 | | 11/1993 | ............ H05B/3/14 |
| JP | 05-33907 | * | 12/1993 | ............ C04B/35/56 |
| JP | 7-89764 | | 4/1995 | ............ C04B/35/565 |
| JP | 7-165408 | | 6/1995 | ............ C01B/31/36 |
| JP | 8-12435 | | 1/1996 | ............ C04B/35/565 |
| JP | 08-012435 | * | 1/1996 | ............ C04B/35/565 |
| JP | 9-23140 | | 1/1997 | ............ H03K/3/027 |
| JP | 9-48605 | | 2/1997 | ............ C01B/31/36 |
| JP | 9-231471 | | 9/1997 | ............ G07G/1/12 |

* cited by examiner

*Primary Examiner*—Mark Kopec
*Assistant Examiner*—Kallambella Vijayakumar
(74) *Attorney, Agent, or Firm*—Oliff & Berridge, PLC

(57) ABSTRACT

The present invention provides: a fabrication method of a silicon carbide sintered body, including a step of fabricating a mixed powder slurry by dissolving or dispersing silicon carbide powder, at least one organic material composed of a nitrogen source, and at least one organic material composed of a carbon source or carbon powder in a solvent, a step of fabricating a green body by pouring the mixed powder slurry into a mold and drying and a step of filling pores in the green body by immersing the green body in high purity metallic silicon that has been heated to 1450 to 1700° C. in a vacuum atmosphere or inert gas atmosphere and melted, and generating silicon carbide by reacting silicon sucked up into the pores in the green body by capillary action with free carbon in the green body; and a silicon carbide sintered body obtained by a reaction sintering method, having a density of 2.90 g/cm$^3$ or more and a volume resistivity of $10^0$ Ω·cm or less, and containing nitrogen at 150 ppm or more.

7 Claims, 2 Drawing Sheets

US 6,695,984 B1

SILICON CARBIDE SINTER AND PROCESS FOR PRODUCING THE SAME

TECHNICAL FIELD

The present invention relates to a silicon carbide sintered body which is useful as a semiconductor fabrication equipment part, an electronic information equipment part, or a structural part of vacuum equipment or the like, which has high density and conductivity, and which is processable by electrical discharge machining, and to a fabrication method thereof.

BACKGROUND ART

Hitherto, silicon carbide has been noted as a material to be used in high temperature regions because of its excellent strength, heat resistance, thermal impact resistance and wear resistance at high temperatures exceeding 1000° C. Recently, the same has been used as a substitute material for quartz in semiconductor fabrication devices.

One method of fabricating a sintered body made of such silicon carbide is a reaction sintering method. In this reaction sintering method, first, silicon carbide powder and an organic material composed of carbon source or carbon powder are dissolved or dispersed in a solvent, and a mixed powder slurry is fabricated. Then the obtained mixed powder is poured into a mold, extrusion forming die or press forming die, and dried to obtain a green body. Then the obtained green body is heated in a vacuum atmosphere or inert gas atmosphere, and immersed in molten metallic silicon. Free carbon in the green body and silicon sucked up into the green body by capillary action react, so that the silicon carbide sintered body is obtained.

However, the silicon carbide sintered body fabricated as above is generally electrically insulative. Hence, electrical discharge machining could not be performed, and there were limits in machining. In particular, when manufacturing a thin film part of 1 mm or less, handling of the green body was difficult. Therefore, it was usually necessary to manufacture a green body of several millimeters and, after forming a sintered body, grind-process the same to a specified thickness by milling machining or the like, which was a significant economical drawback.

DISCLOSURE OF THE PRESENT INVENTION

An object of the present invention is to provide a silicon carbide sintered body having high density and conductivity, which is electrical discharge machinable, and a fabrication method thereof.

The present inventors studied intensively, thus finding that a silicon carbide sintered body meeting this object can be fabricated, and completed the present invention.

That is, the present invention provides, by reaction sintering, a silicon carbide sintered body having a density of 2.90 g/cm$^3$ or more and a volume resistivity of $10^0$ Ω·cm or less, and containing nitrogen at 150 ppm or more.

The present invention further provides a fabrication method of the silicon carbide sintered body, including: a step of fabricating a mixed powder slurry by dissolving or dispersing silicon carbide powder, at least one organic material composed of a nitrogen source, and at least one organic material composed of a carbon source or carbon powder in a solvent; a step of fabricating a green body by pouring the mixed powder slurry into a mold and drying; and a step of filling pores in the green body by immersing the green body in high purity metallic silicon that has been heated to 1450 to 1700° C. and melted in a vacuum atmosphere or inert gas atmosphere, and generating silicon carbide by reacting silicon sucked up into the pores in the green body by capillary action with free carbon in the green body.

Further, the present invention provides a fabrication method of a silicon carbide sintered body, including: a step of fabricating a silicon carbide powder containing nitrogen by dissolving at least one silicon source containing a silicon compound, at least one carbon source containing a organic compound that generates carbon when heated, at least one organic material composed of a nitrogen source, and a polymerizing or crosslinking catalyst in a solvent, drying, and then burning an obtained powder in a non-oxidizing atmosphere; a step of fabricating a mixed powder slurry by dissolving or dispersing the silicon carbide powder containing nitrogen and at least one organic material composed of a carbon source or carbon powder in a solvent; a step of fabricating a green body by pouring the mixed powder slurry into a mold and drying; and a step of filling pores in the green body by immersing the green body in high purity silicon that has been heated to 1450 to 1700° C. in a vacuum atmosphere or inert gas atmosphere and melted, and generating silicon carbide by reacting silicon sucked up into the pores in the green body by capillary action with free carbon in the green body.

BEST MODE FOR CARRYING OUT THE PRESENT INVENTION

The present invention is further described below.

The silicon carbide sintered body of the present invention is obtained by a reaction sintering method, has a density of 2.90 g/cm$^3$ or more and a volume resistivity of $10^0$ Ω·cm or less, and contains nitrogen at 150 ppm or more. Further, bending strength of the silicon carbide sintered body of the present invention should favorably be 240 MPa or more.

The reason for conductivity of the silicon carbide sintered body of the present invention is presumed to be generated by a phenomenon almost the same as the phenomenon disclosed in previous applications by the present applicant, in Japanese Patent Application Laid-Open (JP-A) No. 9-23140 and No. 9-231471. That is, since the silicon carbide sintered body of the present invention contains nitrogen at 150 ppm or more in the form of solid solution, a barrier of a spatial charging layer produced at a grain boundary is about 0.15 eV or less, and a good conductivity is achieved. The volume resistivity of the silicon carbide sintered body at this time is $10^0$ Ω·cm or less. If the nitrogen content is over 200 ppm, the barrier of the spatial charging layer of the grain boundary is 0.026 eV or less, and it is possible for electron to surpass this barrier even at ordinary temperature (300 K) by thermal excitation, and not only thermal excitation conduction is expressed, but also tunnel conduction occurs.

Generally, temperature dependence of volume resistivity of a semiconductor is known to decline with temperature rise (NTC region) and then turn to increase (PTC region). At this time, the smaller the change of the volume resistivity due to temperature change, the easier control of temperature in cases of use the semiconductor as a heating element. Herein, the more the solid solution content of nitrogen in the silicon carbide sintered body, the more a turning-point temperature of the NTC region and PTC region is shifted to a low temperature side. That is, in the silicon carbide sintered body of the present invention, the NTC region in the low temperature zone, where change of the volume resistivity is largest, can be reduced by controlling the content of nitrogen to a range of 150 ppm or more, preferably 200 ppm or more, and hence a variation of the volume resistivity due to a temperature change from ordinary temperature to a high temperature can be decreased.

Figure 1:
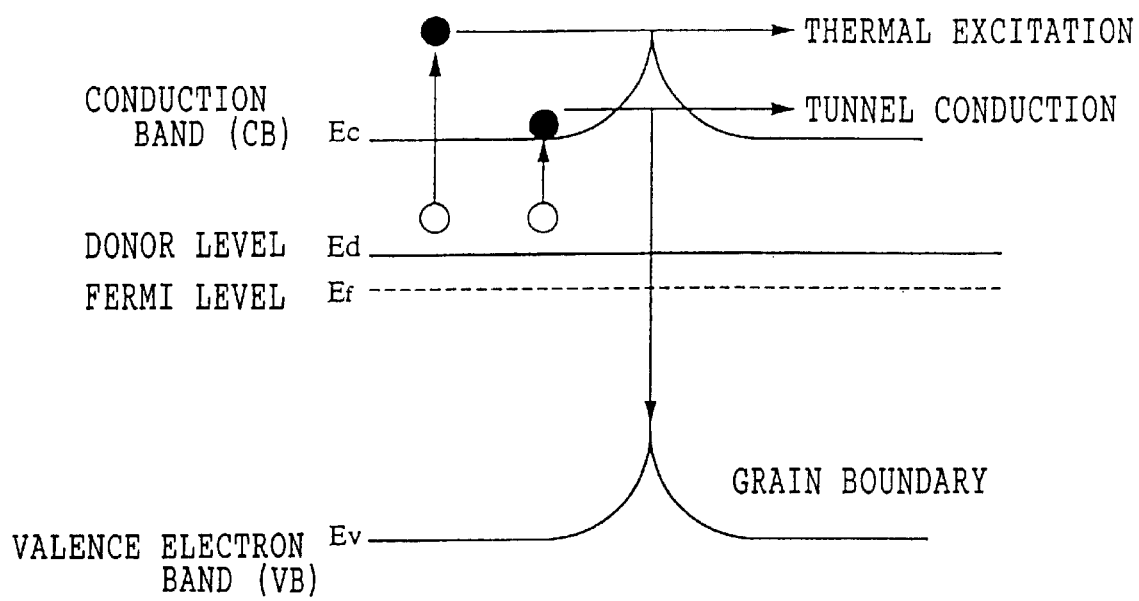
FIG. 1 is a schematic diagram of electric current flowing near a grain boundary of a silicon carbide sintered body.

The mechanism of this action is explained below by referring to a schematic diagram. FIG. 1 is a schematic diagram of an electric current flowing near the grain boundary of the silicon carbide sintered body, in which Ev–Ec is a band gap of silicon carbide, Ed–Ec is a donor level, and a crest is the grain boundary barrier. In the conduction mechanism of the silicon carbide sintered body (polycrystalline), near room temperature, the electron, which is a conduction carrier, does not have enough thermal energy to surpass the grain boundary barrier, and conduction allowing the electron to break through the grain boundary barrier by the tunnel effect is dominant; and in a high temperature region of 500 to 700° C., the conduction allowing the electron to surpass the grain boundary barrier by thermal excitation is dominant. In order that the resistance-temperature characteristic at high temperature be positive characteristic, a state in which all electrons released by the solid solution nitrogen are provided with enough thermal energy to surpass the grain boundary barrier (the same state as that known as donor depletion in semiconductor theory), mobility is lowered by phonon scattering by lattice vibration, and resistance increases is necessary. Therefore, near room temperature, the silicon carbide sintered body shows a conductivity nearly the same as that of a single crystal. That is, room temperature resistance R of the silicon carbide sintered body is expressed by the following formula 1.

$$R=1/(e \times n \times \mu) \quad \text{Formula 1}$$

(e: electron charge, n: solid solution amount of nitrogen, $\mu$: mobility of electron)

In formula 1, e is a physical constant, and is hence invariable. The mobility p varies with temperature, but is constant at room temperature. Therefore, the room temperature resistance R of the silicon carbide sintered body near room temperature is dominated by the nitrogen content. In other words, the more nitrogen is contained, the lower is the room temperature resistance R of the silicon carbide sintered body and, in order to achieve a favorable conductivity, the content of nitrogen in the sintered body should be 150 ppm or more, and preferably 200 ppm or more and, from the viewpoint of stability, the nitrogen is preferably contained in the form of solid solution.

The silicon carbide sintered body of the present invention preferably has a total content of impurity elements of less than ppm, more preferably less than 5 ppm. The impurity content in the silicon carbide sintered body of the present invention is preferably less than 10 ppm, but the impurity content by chemical analysis only has meaning as a reference value. Practically, evaluations differ depending on whether impurities are distributed uniformly or gathered locally. Therefore, those skilled in the art generally evaluate by various means to study how much the silicon carbide sintered body is contaminated by impurities in specific heating conditions by using practical equipment. Herein, impurity elements are elements belonging to group 1 to group 16 of the periodic table of IUPAC Inorganic Chemical Nomenclature Revision 1989, of atomic number 3 and higher, excluding elements of atomic numbers 6 to 8 and 14.

The silicon carbide sintered body of the present invention is a high density silicon carbide sintered body with a density of 2.9 g/cm$^3$ or more. In having the density of 2.9 g/cm$^3$ or more, the silicon carbide sintered body of the present invention tends to be a polycrystalline semiconductor expressing conductivity. That is, conductive electrons contributing to electric conduction flow among silicon carbide crystals across grain boundaries, and hence a junction between a grain boundary phase and silicon carbide is also important for expression of conductivity. A mobility characteristic of conductive electrons is roughly classified into tunnel conduction and thermal excitation conduction.

The silicon carbide sintered body of the present invention favorably has a toughness of 4 MPa$\sqrt{m}$ or more.

Other preferred properties of the silicon carbide sintered body of the present invention are discussed. Preferably, the silicon carbide sintered body of the present invention should have a bending strength of 240 to 600 MPa at room temperature, a bending strength of 55.0 to 80.0 MPa at 1500° C., a Young's modulus of $3.0 \times 10^5$ to $4.0 \times 10^5$ MPa, a Vickers hardness of $1.9 \times 10^5$ MPa or more, a Poisson's ratio of 0.14 to 0.21, a coefficient of thermal expansion of $3.8 \times 10^{-6}$ to $4.2 \times 10^{-6}$ (° C.$^{-1}$), a thermal conductivity of 100 W/(m×k) or more, a specific heat of 0.15 to 0.18 cal/(g×° C.), and a thermal impact resistance of 400 to 600 $\Delta$T° C.

The silicon carbide sintered body of the present invention is obtained by the reaction sintering method. A preferable reaction sintering method is explained below.

The reaction sintering method favorably comprises a step of fabricating silicon carbide powder, a step of fabricating mixed powder slurry from the silicon carbide powder, a step of fabricating green body from the mixed powder slurry, and a step of fabricating the silicon carbide sintered body from a green body. In the present invention, the green body is a silicon carbide form before reaction sintering, containing many pores, which is obtained by removing a solvent from the mixed powder slurry.

The silicon carbide sintered body obtained by the reaction sintering method is characterized by containing nitrogen, and as a method of introducing nitrogen, adding at least one organic material composed of a nitrogen source at the step of fabricating the silicon carbide powder or the step of fabricating the mixed powder slurry from the silicon carbide powder is favorable.

The step of fabricating silicon carbide powder is a process of dissolving at least one silicon source containing a silicon compound, carbon source containing at least one organic compound for producing carbon by heating, and a polymerizing or crosslinking catalyst in a solvent, drying, and baking obtained powder in a non-oxidizing atmosphere.

The step of fabricating mixed powder slurry from the silicon carbide powder is a process of fabricating mixed powder slurry by dissolving or dispersing silicon carbide powder, and organic material containing at least one carbon source or carbon powder in a solvent. By stirring and mixing sufficiently when dissolving or dispersing in the solvent, pores can be uniformly dispersed in the green body at the step of fabricating the green body from the mixed powder slurry.

The step of fabricating the green body from the mixed powder slurry is a process of fabricating the green body by pouring the mixed powder slurry into a mold, and drying.

The step of fabricating the silicon carbide sintered body from the green body is a process of immersing the green body in high purity silicon heated to 1450 to 1700° C. in a vacuum atmosphere or inert gas atmosphere and melted, sucking the silicon into pores in the green body by capillary action, producing silicon carbide by reaction between the silicon and free carbon in the green body, and filling up the pores in the green body. By this process, the green body is sintered by reaction, and the silicon carbide sintered body is obtained.

The method of introducing nitrogen is specifically explained below.

In a reaction sintering method including a nitrogen introducing step, a method of introducing nitrogen into the silicon carbide sintered body is realized by a method of adding at least one organic material composed of a nitrogen source, at the same time as the silicon source and the carbon source, at the step of fabricating the silicon carbide powder, or by a method of adding at least one organic material composed of a nitrogen source into the solvent simultaneously with the at least one organic material composed of a carbon source or carbon powder, and dissolving or dispersing, at the step of fabricating the mixed powder slurry from the silicon carbide powder.

The organic material composed of the nitrogen source is, preferably, a substance generating nitrogen by heating, for example, a high polymer compound (specifically a polyimide resin, nylon resin, etc.), and an organic amine (specifically hexamethylenetetramine, ammonia, triethylamine, and salts thereof) , and, of these, hexamethylenetetramine is particularly preferable. Moreover, a phenol resin synthesized by using hexamine as a catalyst, such as a phenol resin containing nitrogen derived from such a synthesizing process at 2.0 mmol or more per 1 g of resin, is preferably used as the nitrogen source. The organic material composed of such a nitrogen source may be used either alone or in a combination of two or more types.

The content of the organic material composed of nitrogen source is preferably 1 mmol or more of nitrogen per 1 g of silicon source when nitrogen source is added at the same time as the silicon source and carbon source at the step of fabricating the silicon carbide powder, and hence 80 to 1000 $\mu$g per 1 g of silicon source is preferable. Further, preferably 0.7 mmol or more of nitrogen is added per 1 g of the silicon carbide powder when added at the same time as at least one organic material composed of a carbon source or carbon powder at the step of fabricating the mixed powder slurry from the silicon carbide powder, and hence 200 to 2000 $\mu$g per 1 g of silicon carbide powder is preferabe, and 1500 to 2000 $\mu$g is more preferable.

The step of fabricating the silicon carbide powder is more specifically explained.

In the reaction sintering method, the silicon carbide powder used as the raw material for the silicon carbide sintered body maybe an alpha-type, beta-type or amorphous material, or a mixture thereof. In order to obtain a silicon carbide sintered body of high purity, it is preferable to use silicon carbide powder of high purity as the silicon carbide powder material.

The grade of a beta-type silicon carbide powder is not particularly limited, and, for example, a general commercial product of beta-type silicon carbide powder may be used.

The particle size of the silicon carbide powder is preferably smaller, from the viewpoint of obtaining higher density, and is specifically about 0.01 to 10 $\mu$m, and preferably 0.05 to 5 $\mu$m. If the particle size is less than 0.01 $\mu$m, the powder is hard to handle in the weighing and mixing process, and if more than 10 $\mu$m, specific surface area is smaller; that is, a contact area with adjacent powder is smaller, and it is hard to obtain high density.

The silicon carbide powder of high purity can be obtained, for example, by the process of dissolving at least one silicon source containing a silicon compound, the carbon source containing at least one organic compound for producing carbon by heating, and the polymerizing or crosslinking catalyst in the solvent, drying, and baking the obtained powder in the non-oxidizing atmosphere.

As the silicon source containing a silicon compound (hereinafter called silicon source), both liquid and solid may be used together, and at least one type must be selected from liquid materials. As the liquid type, alkoxysilanes (mono-, di-, tri-, tetra-) and polymers of tetraalkoxysilane are used. Among alkoxysilanes, tetraalkoxysilane is preferably used, and specific examples include methoxysilane, ethoxysilane, propoxysilane, and butoxysilane, and ethoxysilane is particularly preferred from the viewpoint of handling. Polymers of tetraalkoxysilane include low molecular weight polymers (oligomers) with a degree of polymerization of about 2 to 15, and liquid silicic acid polymers of a high degree of polymerization. Solid materials to be used together therewith include silicon oxides. In the reaction sintering method, silicon oxides include, aside from SiO, silica sol (a solution containing colloidal ultra-fine silica, having an OH group or alkoxy group inside), silicon dioxide (silica gel, fine silica, quartz powder, etc.), and others. These silicon sources may be used either alone or in a combination of two or more types.

Among these silicon sources, from the viewpoint of homogeneity and handling, an oligomer of tetraethoxysilane and a mixture of an oligomer of tetraethoxysilane with fine silica are preferable. These silicon sources are used at high purity, and an initial impurity content is preferably 20 ppm or less, more preferably 5 ppm or less.

The carbon source containing an organic compound that produce carbon when heated (hereinafter called carbon source) may be either liquid, or liquid and solid used together, and include an organic compound whose carbon residual rate is high, and which be capable of polymerizing or crosslinking by a catalyst or by heating, and specific examples are monomers or prepolymers of phenol resin, furan resin, polyimide, polyurethane, polyvinyl alcohol, and other resins, further including liquids such as cellulose, sucrose, pitch, and tar, and resol type phenol resin is particularly preferred. These carbon sources may be used either alone or in a combination of two or more types. The purity may be properly controlled and selected depending on purpose, and in particular when a silicon carbide powder of high purity is required, it is preferable to use an organic compound containing each metal at not more than 5 ppm.

As the polymerizing and crosslinking catalyst used in fabrication of the silicon carbide powder of high purity, a proper material may be selected depending on the carbon source used, and toluene sulfonic acid, toluene carbonic acid, acetic acid, oxalic acid, sulfuric acid or an other acid may be used when the carbon source is phenol resin or furan resin. In particular, toluene sulfonic acid is preferable.

In the process of manufacturing the high purity silicon carbide powder as the raw material powder used in the reaction sintering method, a blending ratio of carbon and silicon (C/Si ratio hereinafter) is defined by element analysis of carbide intermediate material obtained by carbonizing the mixture at 1000° C. Stoichiometrically, at a C/Si ratio of 3.0, content of free carbon in the produced silicon carbide should be 0%, but actually, due to dissipation of SiO gas generated at the same time, free carbon is produced at a low C/Si ratio. It is important to determine the blend preliminarily so that the free carbon amount in the produced silicon carbide powder may be within a suitable amount for the purpose of fabrication of the sintered body or the like. Usually, the generation of the free carbon can be suppressed when the C/Si ratio is 2.0 to 2.5 at 1600° C. or higher at around one atmospheric pressure, and this range is favorably used. When the C/Si ratio is over 2.5, the amount of the free carbon increases remarkably, but the free carbon has an effect of suppressing grain growth, so the ration may be selected suitably depending on the purpose of particle forming. However, when ambient pressure is a low pressure or high pressure, the C/Si ratio for obtaining pure silicon carbide varies, hence the ration is not always limited within this range of C/Si ratios.

In the reaction sintering method, in order to obtain powder by dissolving the silicon source and the carbon source containing an organic compound producing carbon by heating in the solvent and drying, as required, a mixture of the silicon source and the carbon source containing the organic compound is cured and ground to powder. Curing methods include a crosslinking method by heating, a curing method using a curing catalyst, and a method using electron rays or radiation. The curing catalyst may be properly selected depending on the carbon source used and, in the case of phenol resin or furane resin, for example, acids such as toluene sulfonic acid, toluene carboxylic acid, acetic acid, oxalic acid, hydrochloric acid, sulfuric acid or maleic acid, and amines such as hexamine may be used. These catalysts are dissolved or dispersed in the solvent, and mixed. Usable solvents are lower alcohols (for example, ethyl alcohol), ethyl ether, acetone, etc.

Powder obtained by dissolving the silicon source and the carbon source containing the organic compound producing carbon when heating in the solvent and drying, is heated and carbonized. That is, the powder is heated in a non-oxidizing atmosphere of nitrogen or argon at 800 to 1000° C. for 30 to 120 minutes.

This carbide is further heated in a non-oxidizing atmosphere of argon or the like at 1350 to 2000° C., and the silicon carbide is produced. Baking temperature and time may be properly selected depending on the desired particle size and other properties, and it is preferable to bake at 1600 to 1900° C. for more efficient production.

If silicon carbide powder of higher purity is required, impurities can be further removed by heating for 5 to 20 minutes at 2000 to 2100° C. at the time of baking.

Hence, the method of obtaining the silicon carbide powder of high purity, in particular, can be a fabrication method of powder material as proposed in the fabrication method of single crystals as applied for by the present applicant previously in Japanese Patent Application Laid-Open (JP-A) No. 9-48605, which is a fabrication method of high purity silicon carbide powder, comprising a silicon carbide forming step of obtaining silicon carbide powder by mixing a silicon source of at least one selected from high purity tetraalkoxysilane and a polymer of tetraalkoxysilane, and a carbon source of high purity organic compound for producing carbon by heating, homogeneously, and heating and baking an obtained mixture in a non-oxidizing atmosphere, and an after-treatment step of holding the obtained silicon carbide powder at a temperature of from 1700° C. or more to less than 2000° C., and heating at least once for 5 to 20 minutes at a temperature of 2000 to 2100° C. while holding at a specified temperature and, by these two steps, silicon carbide powder with each content of impurity elements of 0.5 ppm or less is obtained. The silicon carbide powder obtained in this procedure is not uniform in size, and is hence processed by pulverizing or classifying so as to conform to a specified particle size.

When introducing nitrogen in the process of fabricating the silicon carbide powder, first, the silicon source, carbon source, organic material containing the nitrogen source, and polymerizing or crosslinking catalyst are mixed homogeneously, and, as mentioned above, it is preferable to mix sufficiently with the silicon source such as the oligomer of tetraethoxysilane with the carbon source such as phenol resin, the organic material composed of the nitrogen source such as hexamethylenetetramine, and the polymerizing or crosslinking catalyst such as toluene sulfonic acid, in the solvent such as ethanol when dissolving these materials in the solvent.

The step of fabricating the mixed powder slurry from silicon carbide powder is more specifically explained below.

In the process of fabricating the mixed powder slurry from the silicon carbide powder, the silicon carbide powder and the organic material containing at least one carbon source or carbon powder are dissolved or dispersed in the solvent, and the mixed powder slurry is manufactured, and by stirring and mixing sufficiently when dissolving or dispersing in the solvent, the pores are uniformly dispersed in the green body.

At the step of fabricating the mixed powder slurry from the silicon carbide powder, the organic material composed of the carbon source used together with the silicon carbide powder is a substance known as a carbon source for producing carbon by heating, and specific examples include organic compounds for producing carbon by heating. The organic material composed of the carbon source may be used either alone or in a combination of two or more types.

The organic compound for producing carbon by heating is preferably a conductive material, and specific examples are coal tar pitch of high residual carbon rate, pitch tar, phenol resin, furane resin, epoxy resin, phenoxy resin, glucose or other monosaccharides, sucrose or other oligosaccharides, cellulose, starch or other polysaccharides, and the like. These are preferably, for the purpose of mixing homogeneously in silicon carbide powder, liquid at ordinary temperature, soluble in the solvent, and thermoplastic or thermofusible so as to be softened or liquefied by heating, and, above all, a phenol resin high in strength of obtained formed matter is preferable, especially a resol type phenol resin.

As the carbon powder used together with the silicon carbide powder at the step of fabricating the mixed powder slurry from the silicon carbide powder, carbon black, acetylene black, other heat-degradable carbon, graphite, active carbon, and water-dispersant carbon may be used, and preferably conductive carbon is selected. In particular, of these, the conductive carbon black is preferable.

At the step of fabricating the mixed powder slurry from the silicon carbide powder, the silicon carbide powder and the organic material composed of the carbon source or carbon powder are dissolved or dispersed in the solvent, and the mixed powder slurry is fabricated and, as the solvent used in this process, aside from water, a lower alcohol, such as ethyl alcohol, ethyl ether, or acetone may be used for the phenol resin which is an organic compound producing carbon by appropriate heating. The organic material composed of the carbon source or carbon powder and the solvent are preferably low in contents of impurities.

An organic binder may be added at the step of fabricating the mixed powder slurry from the silicon carbide powder. As the organic binder, a peptizer and a powder adhesive may be used, and as the peptizer, in order to enhance a conductivity applying effect, a nitrogen compound is preferred. Ammonia, ammonium salt polyacrylate or the like may be preferably used. As the powder adhesive, polyvinyl alcohol, urethane resin (for example, water-soluble polyurethane) and others may be preferably used.

Further, a defoaming agent may also be added. A silicone defoaming agent or the like may be used as the defoaming agent.

The amount of organic material composed of the carbon source to be mixed with the silicon carbide powder is preferably 10 to 50% in terms of carbon content, more preferably 15 to 40%. If the amount is less than 10%, at the step of fabricating the silicon carbide sintered body from the green body, carbon is insufficient when immersing in silicon to transform into SiC, and Si not subject to reaction is left over in the pores at more than 5%, and conductivity is hardly obtained. If the amount exceeds 50%, thixotropy of the slurry is likely to be larger, and forming performance tends to decline, and the slurry cannot be practicably used.

In the reaction sintering method, stirring and mixing at each step may be conducted by a known stirring and mixing means, such as a mixer or planetary ball mill. It is preferable to stir and mix for 10 to 30 hours, more preferably 16 to 24 hours.

The step of fabricating the green body from the mixed powder slurry is more specifically explained.

When forming the mixed powder slurry by pouring into a mold, generally, a casting process is preferred. The mixed powder slurry is poured into the mold, let stand, removed from the mold, and dried by heating in temperature conditions of 50 to 60° C. or dried in air to remove solvent, and a green body of specified dimensions is obtained.

The step of fabricating the silicon carbide sintered body from the green body is more specifically explained.

The green body manufactured in the specified procedure is immersed in molten high purity metallic silicon heated above the melting point of high purity metallic silicon, specifically 1450 to 1700° C., in a vacuum atmosphere or inert gas atmosphere. By immersing the green body in the molten metallic silicon, liquid silicon permeates into the pores of the green body by capillary action, and the silicon and free carbon in the green body react with each other. By this reaction, silicon carbide is produced, and the pores in the green body are filled up with the produced silicon carbide.

The reaction between the silicon and free carbon takes place at about 1420 to 2000° C. as shown at the step of fabricating the silicon carbide powder, and hence the reaction with free carbon starts and promotes when the molten high purity metallic silicon heated to 1450 to 1700° C. permeates into the green body.

The immersion time of the green body in the molten metallic silicon is not particularly specified, but may be properly determined in consideration of size of the green body and amount of free carbon in the green body.

The high purity metallic silicon is melted when heated to 1450 to 1700° C., preferably 1550 to 1650° C., if the melting temperature is less than 1450° C., viscosity of the high purity metallic silicon elevates, and hence the same does not permeate into the green body by capillary action, and if the melting temperature exceeds 1700° C., evaporation is extreme, and a furnace body may be damaged.

As the high purity metallic silicon, for example, metallic silicon in powder, granule or lump form may be used, and preferably metallic silicon of 2 to 5 mm lumps is used. In the specification, high purity means an impurity content of less than 1 ppm.

Thus, by reaction between the silicon and the free carbon contained in the green body containing nitrogen, the pores in the green body are filled up with the produced silicon carbide, so that a silicon carbide sintered body having high density and excellent electric characteristics may be obtained.

In order to obtain a silicon carbide sintered body having a high bending strength, it is preferable to bake preliminarily the green body prior to baking. By this preliminary baking process, traces of moisture, peptizer, binder and other organic components not removed by drying can be completely removed.

A preliminary baking temperature is 1200 to 2400° C., preferably 1450 to 2000° C. If less than 1200° C., contact of the silicon carbide powder in the green body is not sufficiently promoted, contact strength is insufficient, and handling is inconvenient, and if exceeding 2400° C., powder growth of the silicon carbide powder in the green body is extreme, and subsequent permeation of the molten high purity silicon is insufficient.

A temperature rise rate of the preliminary baking process is preferably 1 to 3° C./min until 800° C., and 5 to 8° C./min from 800° C. to a maximum temperature, but should be determined appropriately in consideration of shape and size of the green body and other conditions.

A maximum temperature holding time in the preliminary baking process is preferably 10 to 120 minutes, more preferably 20 to 60 minutes, but should be determined appropriately in consideration of the shape and size of the green body and other conditions.

The preliminary baking process should preferably be done in a vacuum atmosphere or inert gas atmosphere from the viewpoint of prevention of oxidation.

By this preliminary baking process, a sintered body having a bending strength of 300 MPa or more at room temperature may be obtained. Further, even if the shape is complicated, a sintered body free from cracks, cuts or other defects may be obtained.

Thus, by the reaction sintering method, the silicon carbide sintered body having high purity, high density, high toughness, and excellent conductivity, and processable by electrical discharge machining can be obtained.

In the reaction sintering method, the fabrication equipment is not particularly limited as long as the heating conditions of the present invention can be satisfied, and a known heating furnace and reaction equipment can be used.

The silicon carbide sintered body of the present invention is processed by machining, polishing, cleaning, etc., depending on the purpose of use. The silicon carbide sintered body obtained by the fabrication method of the present invention can be favorably used in semiconductor manufacturing parts, electronic information appliance parts and others, after being processed by electrical discharge machining.

EXAMPLES

The present invention is specifically described below by showing Examples, but it must be noted that the present invention is not limited to these Examples only, but may be changed and modified within the scope of the present invention.

Example 1

As a silicon carbide powder, 850 g of high purity silicon carbide powder with a central particle size of 1.1 μm (silicon carbide with an impurity content of 5 ppm or less fabricated according to a fabrication method proposed in Japanese Patent Application Laid-Open (JP-A) No. 9-48605, containing 1.5 wt. % of silica) was put in 500 g of water in which was dispersed 150 g of carbon black as an organic material composed of a carbon source (#SL200, produced by Shinnikka), 8.5 g of hexamethylenetetramine as an organic material composed of a nitrogen source, and 9 g of ammonium polyacrylate as a peptizer, and dispersed and mixed in a ball mill for 6 hours. Then 30 g of water-soluble polyurethane as a powder adhesive (U-COAT produced by Sanyo Kasei) and 10 g of a silicone defoaming agent (KM72A produced by Shin-Etsu Chemical) were added, and further dispersed and mixed in the ball mill for 10 minutes, and a mixed powder slurry with a viscosity of 3 poise was fabricated.

This mixed powder slurry was poured into a gypsum mold 100 mm in length, 50 mm in width, and 5 mm in thickness, and dried in air for 24 hours (22° C.), and a green body containing free carbon was fabricated.

The green body was put in a graphite crucible of 200 mm in inside diameter and 80 mm in height, and immersed in molten high purity metallic silicon (a product of High Purity Chemical Research Institute) heated to 1550° C. in an argon atmosphere, and held for 30 minutes, causing the free carbon in the green body to react with molten metallic silicon permeating into the green body by capillary action, and the pores in the green body were filled up with the produced silicon carbide, thereby fabricating a silicon carbide sintered body of Example 1.

Example 2

A silicon carbide sintered body of Example 2 was manufactured in the same manner as in Example 1, except that the amount of the silicon carbide powder was changed from 850 g to 800 g and the amount of the organic material composed of the carbon source was changed from 150 g to 200 g.

Comparative Example 1

A silicon carbide sintered body of Comparative Example 1 was manufactured in the same manner as in Example 1, except that the silicon carbide powder in Example 1 was replaced by silicon carbide powder with a central particle size of 2.5 μm, obtained by Adison's method, and hexamethylenetetramine was not added when fabricating the mixed powder slurry.
<Evaluation>

The silicon carbide sintered body samples obtained from Examples 1 and 2 and Comparative Example 1 were evaluated by an Archimedes' density test, measurement of porosity, three-point bending test, four-terminal volume resistivity measurement, measurement of conductivity fluctuation index (beta-value), measurement of toughness, and electrical discharge machining test. Results are summarized in Table 1.

(Archimedes' Density Test, Measurement of Porosity)

The density and porosity of the silicon carbide sintered bodies were measured according to JIS R 1634.

(Three-point Bending Test)

The three-point bending Test of the silicon carbide sintered bodies was conducted according to JIS R 1601.

(Four-terminal Volume Resistivity Measurement)

The volume resistivity of the silicon carbide sintered bodies was measured by a four-terminal method using LORESTER Ap produced by Mitsubishi Chemical. Measuring conditions were specified by a pin interval of 1 mm and sample size (60 mm in length, 15 mm in width, and 3 mm in thickness).

(Measurement of Toughness)

Toughness of the silicon carbide sintered bodies was measured according to an SEPB method of JIS R 1607.

(Electrical Discharge Machining Test)

Electrical discharge machining test of the silicon carbide sintered bodies was conducted using FX2D produced by Mitsubishi Electric. Processing conditions included the maximum peak current Ip=53 A, no-load voltage V0=8 V, and mean machining voltage VG=7 V. An evaluation standard was ○ when the silicon carbide sintered bodies of 200 mm diameter could be machined to a thickness of 2 mm without breakage, and ×when the machining could not be done.

TABLE 1

|  | Example 1 | Example 2 | Comparative Example 1 |
|---|---|---|---|
| Silicon carbide powder (%) | 85 | 80 | 85 |
| Carbon source (%) | 15 | 20 | 15 |
| Addition of nitrogen source | Yes | Yes | No |
| Properties of green body |  |  |  |
| Density (g/cm$^3$) | 1.82 | 1.73 | 1.76 |
| Porosity (%) | 36.8 | 39.3 | 33.5 |
| Si permeation treatment temperature (C.) | 1550 | 1550 | 1550 |
| Properties of silicon carbide sintered body |  |  |  |
| Density (g/cm$^3$) | 2.92 | 2.96 | 2.88 |
| Porosity (%) | 0.89 | 0.93 | 1.11 |
| Bending strength (MPa) | 299 | 243 | 289 |
| Reaction rate (%) | 95.7 | 98.6 | 97.5 |
| Volume resistivity (˙cm) | $8.8 \times 10^{-2}$ | $6.5 \times 10^{-2}$ | $5.5 \times 10^{2}$ |
| Toughness (MPa) m | 5.5 | 4.1 | 3.8 |
| Electrical discharge machining | ○ | ○ | X |

As shown in Table 1, the silicon carbide sintered body samples of Examples 1 and 2 were satisfactory in all measurements.

Example 3

As the silicon carbide powder, 850 g of high purity silicon carbide powder with a central particle size of 0.8 μm (silicon carbide with an impurity content of 5 ppm or less manufactured according to the fabrication method proposed in Japanese Patent Application Laid-Open (JP-A) No. 9-48605, containing 1.5 wt. % of silica) was put in 500 g of water in which was dispersed 150 g of carbon black as the organic material composed the carbon source (#SL200 produced by Shinnikka), 8 g of hexamethylenetetramine as the organic material composed of the nitrogen source, and 9 g of ammonium polyacrylate as the peptizer, and dispersed and mixed in a ball mill for 16 hours. Then 30 g of water-soluble polyurethane as the powder adhesive (U-COAT produced by Sanyo Kasei) and 1 g of the silicone defoaming agent (KM72A of Shin-Etsu Chemical) were added, and further dispersed and mixed in the ball mill for 10 minutes, and a mixed powder slurry with a viscosity of 0.9 poise was fabricated.

This mixed powder slurry was poured into a gypsum mold of 70 mm in length and 10 mm in diameter, and let stand for 6 hours, and removed from the mold, and dried for 12 hours (50° C.), and a green body containing free carbon was fabricated.

The green body was preliminarily baking for 1 hour at 1600° C. (at a temperature rise rate of 1° C./min up to 800° C., and 5° C./min up to 1600° C., in a vacuum atmosphere), and held for 10 minutes, and a preliminarily baked green body was obtained.

The preliminarily baked green body was put in a carbon crucible of 60 mm in inside diameter and 80 mm in height, and immersed in molten high purity metallic silicon, in which lumps of 2 to 5 mm (a product of High Purity Chemical Research Institute) are melted, heated to 1550° C. in an argon atmosphere, and held for 30 minutes, causing the free carbon in the preliminarily baked green body to react with molten metallic silicon permeating into the green body by capillary action, and the pores in the green body were filled up with the produced silicon carbide, thereby manufacturing a silicon carbide sintered body of Example 3.

Comparative Example 2

A silicon carbide sintered body of Comparative Example 2 was manufactured in the same manner as in Example 3, except that hexamethylenetetramine was not added when fabricating the mixed powder slurry and the green body was not preliminarily baked.
<Evaluation>
The silicon carbide sintered body samples obtained from Example 3 and Comparative Example 2 were evaluated, the same as in Example 1, by the Archimedes' bulk specific gravity test, measurement of porosity, three-point bending test, four-terminal volume resistivity measurement, and electrical discharge machining test. Results are summarized in Table 2.

TABLE 2

|  | Example 3 | Comparative Example 2 |
|---|---|---|
| Silicon carbide powder (g) | 850 | 850 |
| Carbon source (g) | 150 | 150 |
| Addition of nitrogen source | Yes | No |
| Preliminary baking process | Yes | No |
| Si permeation treatment temperature (C.) | 1580 | 1580 |
| Properties of silicon carbide sintered body |  |  |
| Bulk specific gravity | 3.00 | 2.86 |
| Porosity (%) | 0.18 | 0.99 |
| Bending strength (MPa) | 339 | 295 |
| Volume resistivity (˙cm) | $5.9 \times 10^{-2}$ | $6.1 \times 10^{2}$ |
| Electrical discharge machining | ○ | X |

As shown in Table 2, the preliminarily baked silicon carbide sintered body of Example 3 was improved in bending strength.

Example 4

Figure 2A:
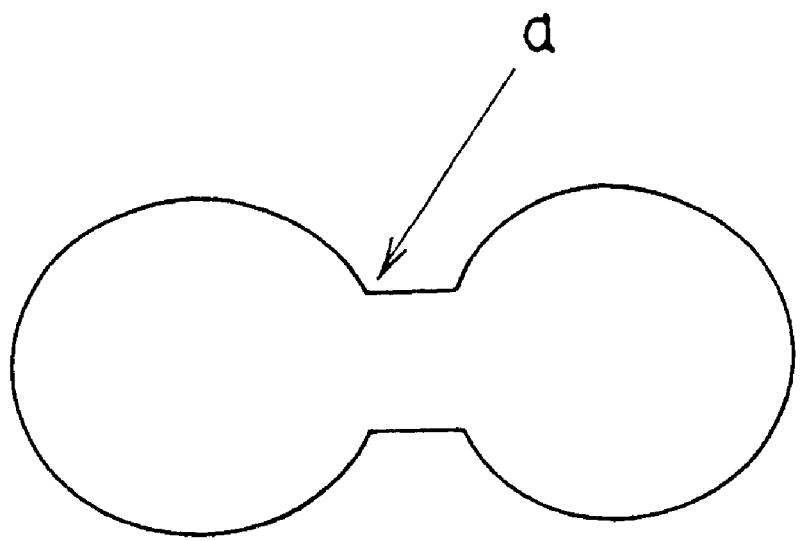
FIG. 2A is a plan view showing a mold used in Example 4 and Comparative Example 3.
Figure 2B:
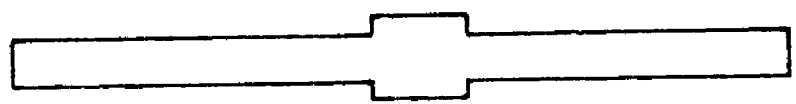
FIG. 2B is a sectional view thereof.

A silicon carbide sintered body of Example 4 was fabricated in the same manner as in Example 3, except that the mixed powder slurry manufactured in Example 3 was poured into the mold shown in FIG. 2A and FIG. 2B. FIG. 2A is a plan view of the mold, and FIG. 2B is a side view of the mold.

Comparative Example 3

A silicon carbide sintered body of Comparative Example 3 was manufactured in the same manner as in Comparative Example 2, except that the mixed powder slurry manufactured in Comparative Example 2 was poured into the mold shown in FIG. 2A and FIG. 2B.
<Evaluation>
The silicon carbide sintered body samples obtained from Example 4 and Comparative Example 3 were evaluated with respect to silicon permeability and appearance as respectively follows. Results are summarized in Table 3.

(Silicon Permeability)
The obtained silicon carbide sintered body was cut in a longitudinal direction, and the fracture was observed, and silicon permeation was evaluated.
(Appearance)
The appearance of the obtained silicon carbide sintered body was observed, and presence or absence of surface cracks was detected.

TABLE 3

|  | Example 4 | Comparative Example 3 |
|---|---|---|
| Silicon permeation | Permeated | Permeated |
| Permeation | No crack | Crack in part a |

It is understood from Table 3 that a defect (crack) was formed in part a in FIG. 2A in a non-preliminarily baked silicon carbide sintered body, whereas a preliminarily baked silicon carbide sintered body was intact and excellent in appearance without defects (cracks) even when cast and formed in a complicated shape.

What is claimed is:

1. A silicon carbide sintered body having a density of at least 2.90 g/cm³ and a bending strength of at least 240 MPa, and containing at least 150 ppm of nitrogen and less than 10 ppm of an impurity element.

2. The silicon carbide sintered body of claim 1, fabricated by a reaction sintering method, said reaction sintering method comprising:
   a step of fabricating mixed powder slurry by dissolving or dispersing silicon carbide powder, at least one organic material composed of a nitrogen source, and at least one of organic material composed of a carbon source or carbon powder in a solvent;
   a step of fabricating a green body by pouring the mixed powder slurry into a mold and drying; and
   a step of filling pores in the green body by immersing the green body in high purity metallic silicon that has been heated to 1450 to 1700° C. in a vacuum atmosphere or inert gas atmosphere and melted, and generating silicon carbide by reacting silicon sucked up into the pores in the green body by capillary action with free carbon in the green body.

3. The silicon carbide sintered body of claim 1, fabricated by a reaction sintering method, said reaction sintering method comprising:
   a step of fabricating a silicon carbide powder containing nitrogen by dissolving a at least one silicon source containing a silicon compound, at least one carbon source containing an organic compound that generates carbon when heated, at least one organic material composed of a nitrogen source, and a polymerizing or crosslinking catalyst in a solvent, drying, and then sintering obtained powder in a non-oxidizing atmosphere;
   a step of fabricating mixed powder slurry by dissolving or dispersing the silicon carbide powder containing nitrogen, and at least one of organic material composed of a carbon source or carbon powder in a solvent;
   a step of fabricating a green body by pouring the mixed powder slurry into a mold and drying; and
   a step of filling pores in the green body by immersing the green body in high purity silicon that has been heated to 1450 to 1700° C. in a vacuum atmosphere or inert gas atmosphere and melted, and generating silicon carbide by reacting silicon sucked up into pores in the green body by capillary action with free carbon in the green body.

4. The silicon carbide sintered body of claim 1, fabricated by a reaction sintering method, said reaction sintering method comprising:
- a step of fabricating mixed powder slurry by dissolving or dispersing silicon carbide powder, at least one organic material composed of a nitrogen source, and at least one organic material composed of a carbon source or carbon powder in a solvent;
- a step of fabricating a green body by pouring the mixed powder slurry into a mold and drying; and
- a step of filling pores in the green body by immersing the green body in high purity metallic silicon that has been heated to 1450 to 1700° C. in a vacuum atmosphere or inert gas atmosphere and melted, and generating silicon carbide by reacting silicon sucked up into the pores in the green body by capillary action with free carbon in the green body.

5. The silicon carbide sintered body of claim 1, fabricated by a reaction sintering method, said reaction sintering method comprising:
- a step of fabricating a silicon carbide powder containing nitrogen by dissolving a at least one silicon source containing a silicon compound, at least one carbon source containing an organic compound that generates carbon when heated, at least one organic material composed of a nitrogen source, and a polymerizing or crosslinking catalyst in a solvent, drying, and then sintering obtained powder in a non-oxidizing atmosphere;
- a step of fabricating mixed powder slurry by dissolving or dispersing the silicon carbide powder containing nitrogen, and at least one organic material composed of a carbon source or carbon powder in a solvent;
- a step of fabricating a green body by pouring the mixed powder slurry into a mold and drying; and
- a step of filling pores in the green body by immersing the green body in high purity silicon that has been heated to 1450 to 1700° C. in a vacuum atmosphere or inert gas atmosphere and melted, and generating silicon carbide by reacting silicon sucked up into pores in the green body by capillary action with free carbon in the green body.

6. A fabrication method of a silicon carbide sintered body, comprising:
- a step of fabricating mixed powder slurry by dissolving or dispersing silicon carbide powder, at least one organic material composed of a nitrogen source, and at least one organic material composed of a carbon source or carbon powder in a solvent;
- a step of fabricating a green body by pouring the mixed powder slurry into a mold and drying; and
- a step of filling pores in the green body by immersing the green body in high purity metallic silicon that has been heated to 1450 to 1700° C. in a vacuum atmosphere or inert gas atmosphere and melted, and generating silicon carbide by reacting silicon sucked up into the pores in the green body by capillary action with free carbon in the green body.

7. A fabrication method of a silicon carbide sintered body, comprising:
- a step of fabricating a silicon carbide powder containing nitrogen by dissolving at least one silicon source containing a silicon compound, at least one carbon source containing an organic compound that generates carbon when heated, at least one organic material composed of a nitrogen source, and a polymerizing or crosslinking catalyst in a solvent, drying, and then sintering obtained powder in a non-oxidizing atmosphere;
- a step of fabricating mixed powder slurry by dissolving or dispersing the silicon carbide powder containing nitrogen, and at least one organic material composed of a carbon source or carbon powder in a solvent;
- a step of fabricating a green body by pouring the mixed powder slurry into a mold and drying; and
- a step of filling pores in the green body by immersing the green body in high purity silicon that has been heated to 1450 to 1700° C. in a vacuum atmosphere or inert gas atmosphere and melted, and generating silicon carbide by reacting silicon sucked up into pores in the green body by capillary action with free carbon in the green body.

* * * * *